United States Patent Office 3,244,667
Patented Apr. 5, 1966

3,244,667
POLYOLEFINS CONTAINING A 2-HYDROXY-
BENZOPHENONE, A ZINC DIALKYL-DI-
THIOPHOSPHATE AND OPTIONALLY A
TRISPHENOL ALKANE AS STABILIZERS
Robin Henry Burgess, Hertford, England, assignor to
Imperial Chemical Industries Limited, London, England, a corporation of Great Britain
No Drawing. Filed July 12, 1962, Ser. No. 209,308
Claims priority, application Great Britain, July 24, 1961,
26,708/61, Patent 991,641
5 Claims. (Cl. 260—45.75)

The present invention relates to stabiliser compositions and to polymeric compositions usefully stabilised therewith.

It is well known that it is desirable to incorporate anti-oxidants into solid polymers and copolymers of aliphatic mono-α-olefines e.g. polythene (the solid polymers of ethylene), polypropylene, polyisobutylene, polybutene-1, poly-3-methyl-butene-1, poly-4-methyl-pentene-1, ethylene/propylene copolymers. These polymers, hereinafter will be referred to as solid olefine polymers as hereinbefore defined.

It is also known that the said olefine polymers are subject to degradation by light, particularly ultra violet light.

Since solid olefine polymers are generally processed, for example, shaped, at high temperatures, it is necessary for them to be stabilised against thermal degradation, particularly thermally induced oxidation, even though after shaping they may only be required to be used at relatively low temperatures. If they are to be exposed to direct sunlight for prolonged periods as, for example out of doors, it is clearly desirable that they should be effectively stabilised against light and heat.

It is unfortunately often true, however, that additives which have been proposed as light stabilisers have only a limited heat stabilising effect, if any, and heat stabilisers in general have little, if any, value as light stabilisers. It is, therefore, necessary for applications involving exposure to heat and light, particularly ultra violet light, to employ both a heat stabiliser and a light stabiliser. By the term heat stabiliser we include both inhibitors of purely thermal degradation (molecular weight reduction), and inhibitors of oxidative degradation. The conventional heat stabilisers for the said polymeric materials are phenols and aromatic amines and a wide variety of these materials has been proposed for this purpose. In particular, it has been proposed to use mixtures of a di- or tri-benzoyl resorcinol as light stabiliser with a variety of amines and phenols as heat stabilisers. It is a disadvantage however with such combinations that in many cases the heat stabiliser somewhat reduces the efficiency of the light stabiliser. This is particularly true of the aromatic amines. The phenols may sometimes slightly increase the protection conferred by the light stabiliser.

It is an object of the present invention to provide stabiliser compositions wherein the activity of a light stabiliser is notably enhanced by the addition thereto of a heat stabiliser, the said compositions being usefully stabilised against thermally induced oxidative degradation.

It is an object of a more limited form of this invention to provide compositions in which the light and heat stabilisers show synergism in respect of the stabilisation against oxidation induced by irradiation of a solid olefine polymer with ultra violet light.

We have now found that certain organic compounds containing phenolic hydroxyl groups and adjacent thereto, doubly bound oxygen or nitrogen atoms are very effective when used together with certain thiophosphorus compounds.

Accordingly the present invention provides stabiliser compositions comprising:
(a) An organic compound effective as a stabiliser against degradation induced by visible or ultra-violet light and having a phenolic nucleus with an organic ortho-substituent attached thereto by a carbon or nitrogen atom (1) to which is attached an oxygen or nitrogen atom (2) linked within the molecule by a double bond, said substituent having an aromatic residue attached to atom (1) or (2), and
(b) A heat stabiliser which is an organic phosphorus compound having phosphorus linked to sulphur in which a phosphorus atom is linked to —OR, —SR, —R, —NRR′, —SNRR′, >O or >S, or to another such phosphorus atom through —S—, —S$_2$—, —S$_3$—, or —S.G.S—, where G is either an organic group which may contain hydrocarbon groups linked by groups having the formula

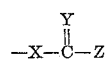

where X and Z are selected from —O—, —S—, and —NR— groups and Y is O or S, R and R′ being hydrocarbon groups or hydrogen atoms, or a metal atom.

R and R′ may for example be methyl, ethyl, isopropyl, n-, sec-, iso- and tert-butyl, sec-octyl, tert-octyl, nonyl, dodecyl, hexadecyl, octadecyl, cyclohexyl, α - methyl cyclohexyl, phenyl and alkylated phenyl, for example dodecylphenyl groups.

Dithiophosphates containing a mercapto group may for example be obtained by reaction between phosphorus pentasulphide and alcohols or phenols.

Treatment of the above compounds with an oxidising agent such as iodine or sodium hypochlorite affords compounds containing a dithio group. Treatment of the above dithiophosphoric acids with sulphur dichloride affords the corresponding compounds containing a trithio group.

As examples of other divalent groups linking two phosphorus atoms and which may be represented by
—S.G.S—
there may be mentioned such groups as

.S.CH$_2$.NH.CH.NH.CH$_2$.S.

and .S.CH$_2$.NH.CO.NH.CH$_2$S. which may be formed by treating the dialkyldithiophosphoric acids with formaldehyde and thiourea or urea respectively.

As examples of substituted alkylthio groups there may be mentioned 1-butoxy-ethylthio and 1-butylthioethylthio.

As metal atoms G there may be mentioned zinc and nickel.

Compounds of the said formula containing a thioamino or substituted thioamino group are obtained for example by reacting a chloroamine with dithiophosphoric acid. Suitable amines include methylamine, dimethylamine, isopropylamine, aniline, substituted anilines, piperidine and morpholine.

Suitable phosphorus compounds are for example diisopropyl, di-n-, sec- or iso-butyl, di-sec-octyl, dinonly, didodecyl, dioctadecyl and di-(p-dodecyl phenyl) dithio-phosphoric acids and the corresponding di- and tri-sulphides, zinc dinonyl dithiophosphate, nickel didodecyl dithiophosphate, tridodecane phosphorotrithioite, tridodecane phosphorotrithiolate, tetrakis (dodecanethio) phosphorotrithioic anhydride, tridodecane phosphorotetrathioate, O,O′-dioctadecane hydrogen phosphorothiolothionate, O, O′,S - trioctadecane phosphorodithioate, thiophosphoric acid tributylamide, bis(dinonyldithiophosphoryl-methylene) thiourea, bis(dinonyldithiophosphorylmethylene) urea, O,O′ - dinonyl-S-tert-butoxy-ethylidene dithiophosphate, and O,O′-dinonyl-S-tert-butylthio-ethylidene dithiophosphate.

Zinc dialkyl dithiophosphates, e.g. dinonyl dithiophosphate are very effective.

One preferred Class (1) of light stabilisers has the structure A.CO.A′ or A.CO.A′.CO.A″, wherein A, A′ and A″ are aromatic nuclei having altogether at least 1 hydroxyl group ortho to a carbonyl group which links nuclear carbon atoms of said nuclei, A, A′ and A″ being the same or different, and there being in each benzene ring at most 1 hydroxyl group ortho to any one of said carbonyl groups. Other substituents which may be present are further hydroxy groups, alkoxyl groups or alkyl groups. Said further hydroxyl groups may if desired be esterified to form simple esters or polyesters or condensed with epoxides to form polyethers. If desired 2 or more molecules may be attached through a carbon or oxygen atom of a group A to a hydrocarbon group, for instance as side groups of a polymeric chain. It is preferred that any alkyl or alkoxyl or other inert substituents have from 1 to 18, more particularly from 6 to 18 carbon atoms, as groups having from 6 to 18 carbon atoms confer improved compatibility with polymer materials on the light stabiliser, without unduly diluting its activity by overloading the molecule with inert groups. Examples of compounds of Class (1) which may be used are the benzophenones having a 2-hydroxy substituent, with if desired substituents selected from hydroxyl, alkoxyl or alkyl groups in positions 2′, 4 and 4′ (the 2,4- and 2,2′,4-substituted compounds being preferred) for instance, the 2,2′-dihydroxy-4,4′-dimethoxy, 2,4-dihydroxy, 2-hydroxy-4-allyl, 2-hydroxy-4-tertiary butyl, 2-hydroxy-4-n-octyl, 2-hydroxy-4-(2′ ethyl hexyl), 2-hydroxy-(3′,5′,5′ trimethyl hexyl), 2-hydroxy-4-dodecyl, 2-hydroxyl-4-tridecyl, 2-hydroxy-4-n-hexadecyl, 2-hydroxy-4-n-octadecyl and the corresponding 2-hydroxy-4-hydrocarbonoxy benzophenones, 2,4,4′-tri-hydroxy, 2,2′,4,4′-tetra hydroxy, 2,2′-dihydroxy-4-octyloxy, 2,2′-dihydroxy-4-dodecyloxy, 2,2′-dihydroxy-4-octyl, and 2,2′-dihydroxy-4-dodecyl benzophenones.

Substituents may also be present in the 5 positions as for instance in 2,4,5-trihydroxy benzophenone and 2-hydroxy-5-octyl benzophenone. Examples of other compounds which may be used are the dibenzoyl and disalicyloyl resorcinols.

A second preferred Class (2) of light stabiliser comprises aromatic particularly alkaryl esters of hydroxy aromatic acids for example the salicylates, gentisates, cresotates (e.g. 2-hydroxy-3-(or 5) methyl benzoates), and β-resorcylates of mono-, di-, or tri-hydric phenols or of phenolic compounds containing more than 1 phenolic nucleus. Esters and polyesters formed by the self-condensation of the said phenolic acids may also be used if the said esters contain a hydroxy group ortho to an ester linkage.

In some cases the aroyl groups in the aromatic esters of aromatic acids may migrate under the influence of ultra violet light to give compounds of Class (1). Particular examples of compounds of Class (2) which may be used are para-tertiary butyl phenyl salicylate, p-tertiary octyl phenyl salicylate, pyrogallol trisalicylate, resorcinal monogentisate, polyesters of β-resorcylic or gentisic acids, catechol mono-salicylate, and hydroquinone β-resorcylate.

The alkaryl esters, particularly those in which the alkyl residue of the alkaryl group has from four to eighteen carbon atoms, are preferred.

Other very active light stabiliser are (3) the 2-(2′-hydroxyaryl) benzotriazoles, for instance, the 5′-methyl, 5′-tertiary butyl, 5′-amyl, 5′-cyclohexyl, 5′-phenyl, 5′-methoxy, 5′-carbethoxy, 3′,5′-dimethyl, 3′,5′-dichloro, 4′,5′-dichloro, 5′-tertiary butyl-5-chloro, 5′-phenyl-5-chloro, 5′-cyclohexyl-5-chloro, 5′-phenyl-5-methyl, 5′-methyl-5-ethylsulphonyl, 3′,5′-dimethyl-5-methyl, 3′,5′-dimethyl-5-methoxy, 5′-methyl-5,6-dichloro, and 3′,5′-dimethyl-5-ethyl sulphonyl derivatives of 2-(2′-hydroxy phenyl) benzotriazole, and the esters, e.g. tertiary butyl and hexyl esters, of 2-(2′-hydroxy-5′-methyl phenyl) benzotriazole-5-carboxylic acid and 2-(2′-hydroxy-4′,5′-dimethyl phenyl) benzotriazole-5-carboxylic acid.

Of these, the 5′-methyl and the 5′-tertiary butyl-5-chloro derivatives, particularly the latter, are preferred.

The structural elements of the various classes believed to be responsible for the activity are as follows, A, A′ and A″ being as hereinbefore defined, and —V being —OH or —H. In Class 2, A′ may contain carboxyl groups.

Class 1:

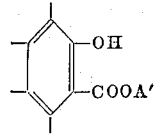

wherein if desired a further group A″CO— may be attached to the ring shown or to A′.

Class 2:

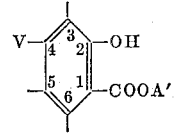

wherein if desired the structure shown may represent a part of a polyester linked through a hydroxyl group at position 4 and a carboxyl group at position 1.

Class 3:

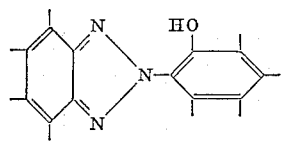

It will be understood that the structure depicted for the benzotriazoles represents only one of the contributing resonance structures; the others are:

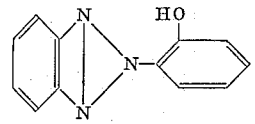

and the equivalent structures differing from this (or from the first depicted) only in the arrangement of the double bonds in the benzene ring or rings.

It will be seen from the above that there are structural similarities between compounds of Classes 1, 2 and 3 since all the compounds have a group —OH closely adjacent to a doubly bound oxygen or nitrogen atom; it is believed that internal hydrogen bonding occurs in these compounds leading to the formation of a six-membered ring.

The organic sulphur compounds give a useful increase in the light stability of the compositions and some protection against thermally induced oxidative degradation. For applications in which resistance to heat is very important the excellent light stability of our compositions allows for some depression of this stability by the inclusion of a small amount of a phenolic antioxidant in order to improve the heat stability.

Preferred phenolic antioxidants are the condensates of three molecules of a 3-alkyl (or alkoxy)-6-branched alkylphenol with one molecule of an unsaturated aldehyde or ketone, particularly condensates of 3-methyl-6-tertiary butyl phenol or 3-methyl-6-tertiary octyl phenol with crotonaldehyde or cinnamaldehyde.

Other phenolic antioxidants which may be used are for instance spirohydrindenes obtainable by the condensation of two molecules of a phenol having a meta and the para position free with three molecules of a ketone $R.CH_2COCH_2R'$ and R and R′ are hydrocarbon groups or hydrogen atoms, spirochromans obtainable by the condensation of two molecules of hydroxyhydroquinone with three molecules of a ketone $RCH_2COCH_2R'$, alkylidene bisphenols in which the alkylidene group preferably has from six to nine carbon atoms, and thiobisphenols e.g. thiobis-(3-methyl-6-tertiary butyl phenol). The phenolic antioxidant should preferably have a boiling point at a pressure of 1 mm. of mercury of at least 200° C.

Accordingly the present invention provides stabiliser compositions comprising mixtures of:

(a) A light stabiliser as hereinbefore defined.

(b) A heat stabilizer which is an organic phosphorus compound having phosphorus linked to sulphur in which a phosphorous atom is linked to —OR, —SR, —R, —NNR', —SNRR', >O or >S, or to another such phosphorus atom through —S—, —S$_2$—, —S$_3$—, or —S.G.S—, where G is either an organic group which may contain hydrocarbon groups linked by groups having the formula

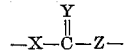

where X and Z are selected from —O—, —S—, and —NR— groups and Y is O or S, R and R' being hydrocarbon groups or hydrogen atoms, or a metal atom and (c) A phenolic antioxidant having at least two phenolic nuclei and having a boiling point at a pressure of 1 mm. of mercury of at least 200° C., in an amount corresponding up to 5 phenolic hydroxyl groups for each sulphur atom provided by (b).

Whilst we find that useful stabilised composition may be obtained with widely varied ratios of said compound (b) to said light stabiliser, and whilst our invention is in no way limited to particular ratios of the ingredients, we find that particularly effective ratios of these ingredients are when there are from 0.1 to 12 active groups provided to the composition by the light stabiliser to each sulphur atom provided to the composition by said compound (b).

The content of these components in these compositons may also be varied over very wide limits. Thus, polythene compositions useful for a wide variety of applications, e.g. for making films are effectively stabilised with, for example 1% by weight of the light stabiliser with an appropriate added amount of the compound (b). For other applications, e.g. mouldings, smaller amounts e.g. 0.1% by weight or even less, of the light stabiliser are often sufficient. In general it is not necessary to use more than 5% by weight and normally not more than 0.5 to 1% by weight of the light stabiliser, appropriate quantities of the compound (b) being used in conjunction with this light stabiliser The compositions of this invention may be prepared in a variety of ways depending upon the manner in which the polymeric material is obtained and the amount of stabilising material to be incorporated in the compositions. Small amounts of the stabilising material may be incorporated into polythene made by the high pressure process by dissolving the stabilising components in a high boiling fluid hydrocarbon liquid and mixing this solution wth the hot polythene in a suitable container after the polythene issues from the converter in which it is produced. Larger quantities of the stabilising components may be mixed with polythene or any polymeric material by any of the mastication processes. A satisfactory method for mixing the stabilising ingredients with, for example, polythene or polypropylene, made by the low pressure process is to add a solution of the components to polythene powder obtained by this process, and then to remove the solvent for the stabilising components by evaporation.

The compositions of this invention may also contain further ancillary ingredients such as processing aids, for example, the soaps of calcium and zinc, and also such materials as pigments, dyes and fillers.

Example 1

Polythene of melt flow index 2 (as measured by the A.S.T.M. method) was mixed on open rolls at 140° C. with light stabilisers and compounds (b) as set out below.

The compositions were pressed at 150° C. into sheets 20 thousandths and 5 thousandths of an inch thick.

Samples of an inch long by ⅞ of an inch wide cut from the sheet were placed on microscope slides in an air oven at 140° C. Samples were removed at intervals and the extent of oxidation was estimated by measuring carbonyl group concentration by infra-red spectroscopy using the absorption band at 5.85 microns wave length. The time before the oxygen present as carbonyl was greater than 0.1% was measured.

Further samples of sheet were placed 10 cm. from a Hanovia S 500 high pressure mercury arc lamp screened by ½ mm. borosilicate glass (cutting out light of wave lengths less than 2950 A.) and the development of carbonyl groups followed by periodical infra-red examination of the samples.

The reported U.V. lifetimes represents times for the development of respectively 0.05% and 0.2% of carbonyl oxygen.

TABLE I

| UV absorber | Compound (b) | Thickness (thousandths of an inch) | Percent by weight of composition (in order of appearance) | UV Life (days) | 140° C. oven life (hours) |
|---|---|---|---|---|---|
| None | None | 20 |  | 5-8 | 4 |
| Do | Zinc dinonyl dithiophosphate (A). | 20 | 0.1 | 5 |  |
| 2-hydroxy-4-octyloxy benzophenone (B) | None | 20 | 0.1 | 10-12 | 3 |
| 2-hydroxy-4-octadecyloxy benzophenone (C). | do | 20 | 0.1 | 9 |  |
| 2,2' dihydroxy-4-octyloxy benzophenone (D). | do | 20 | 0.1 | 9-12 | 5 |
| B | A | 20 | 0.1 | 17 |  |
| C | A | 20 | 0.1 | 11 |  |
| D | A | 20 | 0.1 | 14 | 60 |
| None | None | 5 |  | 16 | 2½ |
| Do | A | 5 | 0.5 | 28½ | 300 |
| Do | O,O,O-triisooctyl-phosphorothioate (E). | 5 | 0.5 | 22½ | 12 |
| 2-hydroxy-4-heptyloxy benzophenone (F) | None | 5 | 0.5 | 50 | 2½ |
| B | do | 5 | 0.5 | 45 | 3 |
| 2-hydroxy-4-dodecyloxy-benzophenone (G). | do | 5 | 0.5 | 54 | 2½ |
| 2-hydroxy-4-hexadecyloxy benzophenone (H). | do | 5 | 0.5 | 50 | 2½ |
| 2-hydroxy-4-octadecyloxy benzophenone (I). | do | 5 | 0.5 |  |  |
| 2-(2'-hydroxy-5'-tertiary butylphenyl) 5-chloro benzotriazole (J). | do | 5 | 1.0 | 48 |  |
| p-octylphenyl salicylate (K) | do | 5 | 1.0 | 25 | 2½ |
| F | E | 5 | 0.5/0.5 | 64 | 2½ |
| B | A | 5 | 0.5/0.5 | 68 | 270 |
| B | A | 5 | *0.5/0.5/0.1 | 75 | 230 |
| G | A | 5 | 0.5/0.5 | 72 | 250 |
| H | A | 5 | 0.5/0.5 | 57 | 190 |
| I | A | 5 | 0.5/0.5 | 52 |  |
| J | A | 5 | 0.5/0.5 | 69 | 220 |
| K | A | 5 | 0.5/0.5 | 29 | 230 |

*This figure represents the percentage of phenolic antioxidant(3M6B/CA, a condensate of 3 molecules of 3-methyl-6-tertiary butyl phenol with one molecule of crotonaldehyde), by weight of the composition, added in this experiment.

Example II

Polypropylene of melt flow index 5 (as measured by the A.S.T.M. method modified by using a 10 kg. weight instead of that specified for causing extrusion) was mixed on open rolls at 170° C. with light stabilisers and compounds (b), as set out below.

The compositions were pressed at 190° C. into sheets of thickness 1/50 of an inch. 1 inch square samples were aged at 140° C. in an air oven and the time to embrittlement recorded.

TABLE II

| UV absorber | Compound (b) | Percent by weight of composition (in order of appearance) | UV Life (days) | 140° C. oven life (hours) |
|---|---|---|---|---|
| None | None | | 1½ | <25 |
| Do | Zinc dinonyl dithiophosphate (A). | 0.5 | 23 | 265 |
| Do | Dinonyldithiophosphoric acid (B). | 0.5 | 15½ | 45 |
| Do | Bis-dinonyl thiophosphoryl disulphide (C). | 0.5 | 13 | <25 |
| Do | O,O-dioctadecane hydrogen phosphoro thiolothionate (D). | 0.5 | 8 | <25 |
| 2-hydroxy-4-octyloxy benzophenone (E). | None | 0.5 | 60½ | <25 |
| 2-hydroxy-4-trimethyl hexyloxy benzophenone (F). | do | 0.5 | 43 | <25 |
| 2,2'-dihydroxy-4-octyloxy benzophenone (G). | do | 0.5 | 43 | <25 |
| 2-(2'-hydroxy-5'-methylphenyl) benzotriazole (H). | do | 0.5 | 8 | <25 |
| p-Octylphenyl salicylate (I) | do | 0.5 | 16 | <25 |
| E | A | 0.5/0.5 | 85½ | 190 |
| E | B | 0.5/0.5 | 64½ | <25 |
| F | C | 0.5/0.5 | 60 | <25 |
| G | D | 0.5/0.5 | 45½ | <25 |
| H | B | 0.5/0.5 | 29 | <25 |
| I | C | 0.5/0.5 | 34 | <25 |
| I | D | 0.5/0.5 | 33½ | <25 |

The ultra violet testing was as in Example 1, except that the carbonyl oxygen concentration used was 0.06%. Abbreviations are also as in Example I.

I claim:

1. A polymeric composition comprising a solid polymer of aliphatic mono-α-olefin and a stabilizer composition comprising (a) 2-hydroxy-4-octyloxybenzophenone and (b) a zinc dialkyldithiophosphate, the amount of said benzophenone being from 0.1 to 5% by weight of said composition and there being from 0.1 to 12 moles of said benzophenone for each sulfur atom provided to the composition by said zinc dialkyl dithiophosphate.

2. A polymeric composition as set forth in claim 1 in which there is from 0.5 to 1% by weight of said benzophenone.

3. A polymeric composition as set forth in claim 1 which also includes (c) a phenolic antioxidant selected from the group consisting of condensates of 3-molecules of a phenol taken from the group consisting of 3-methyl-6-tertiary butyl phenol and 3-methyl-6-tertiary octyl phenol with one molecule of an aldehyde taken from the group consisting of crotonaldehyde and cinnamaldehyde, there being up to 5 hydroxyl groups provided to the composition by said phenolic antioxidant for each sulfur atom provided by said zinc dialkyl dithiophosphate.

4. A polymeric composition as set forth in claim 1 in which said polymer is polyethylene.

5. A polymeric composition as set forth in claim 1 in which said polymer is polypropylene.

References Cited by the Examiner

UNITED STATES PATENTS

| | | | |
|---|---|---|---|
| 2,889,295 | 6/1959 | Darby et al. | 260—45.85 |
| 2,947,721 | 8/1960 | Newland et al. | 260—45.95 |
| 2,964,495 | 12/1960 | Newland et al. | 260—45.95 |
| 2,964,497 | 12/1960 | Kibler et al. | 260—45.75 |
| 2,965,606 | 12/1960 | Watchung et al. | 260—45.75 |
| 2,976,260 | 3/1961 | Newland et al. | 260—45.95 |
| 2,995,540 | 8/1961 | Duennenberger et al. 260—45.95 | |
| 3,003,996 | 10/1961 | Newlard et al. | 260—45.95 |
| 3,022,268 | 2/1962 | Armilage et al. | 260—45.95 |
| 3,033,814 | 5/1962 | Tholstrup et al. | 260—45.95 |
| 3,041,311 | 6/1962 | Baum et al. | 260—45.75 |
| 3,055,862 | 9/1962 | Bentley | 260—45.95 |

LEON J. BERCOVITZ, *Primary Examiner.*

G. W. RAUCHFUSS, *Assistant Examiner.*